United States Patent [19]

Studor et al.

[11] Patent Number: 5,680,632
[45] Date of Patent: Oct. 21, 1997

[54] METHOD FOR PROVIDING AN EXTENSIBLE REGISTER IN THE FIRST AND SECOND DATA PROCESSING SYSTEMS

[75] Inventors: Charles F. Studor; James S. Divine; Michael I. Catherwood, all of Austin, Tex.

[73] Assignee: Motorola, Inc., Schaumburg, Ill.

[21] Appl. No.: 996,744

[22] Filed: Dec. 24, 1992

[51] Int. Cl.$^6$ ........................................ G06F 5/00
[52] U.S. Cl. .................... 395/800; 395/385; 395/386; 395/389; 395/500; 395/376; 364/DIG. 1
[58] Field of Search .................... 395/800, 500, 395/375, 385, 386, 376, 389; 364/DIG. 1, DIG. 2

[56] References Cited

U.S. PATENT DOCUMENTS

| | | | |
|---|---|---|---|
| 4,277,827 | 7/1981 | Carlson et al. | 364/200 |
| 4,287,566 | 9/1981 | Culler | 364/754 |
| 4,300,195 | 11/1981 | Raghunathan et al. | 364/200 |
| 4,361,868 | 11/1982 | Kaplinsky | 364/200 |
| 4,363,091 | 12/1982 | Pohlman et al. | 364/200 |
| 4,430,705 | 2/1984 | Cannavino et al. | 364/200 |
| 4,679,166 | 7/1987 | Berger et al. | 364/200 |
| 4,722,047 | 1/1988 | Chan et al. | 395/400 |
| 4,876,639 | 10/1989 | Mensch, Jr. | 364/200 |
| 4,878,197 | 10/1989 | Nay et al. | 395/250 |
| 5,125,087 | 6/1992 | Randell | 395/425 |
| 5,261,077 | 11/1993 | Duval et al. | 395/500 |
| 5,297,272 | 3/1994 | Lu et al. | 395/500 |

OTHER PUBLICATIONS

Langdon, Jr. "Computer Design", 1982, pp. 275-303.
Motorola, HC11: M68HC11 Reference Manual, 1990, pp. 6-1 through 6-20.
Motorola, MC805 HMOS M146805 CMOS Family User's Manual, 1991, pp. 1-33 and 143-249.

Primary Examiner—Alyssa H. Bowler
Assistant Examiner—Dzung C. Nguyen
Attorney, Agent, or Firm—Susan C. Hill

[57] ABSTRACT

A data processing system providing an extensible register and method thereof. A new CPU has an extensible index register. The new CPU is object code compatible with the old CPU having an 8-bit index register, yet the index register of the new CPU can be effectively extended to 16 bits when new instructions are used. As a consequence, the user is able to make the choice between using assembly code software written for the old CPU and having the functionality of an 8-bit index register, or writing new assembly code software for the new CPU and having the functionality of a 16-bit index register.

39 Claims, 5 Drawing Sheets

```
         7                0
       ┌─────────────────┐
       │ INDEX REGISTER  │─302
       └─────────────────┘
```

FIG.4
—PRIOR ART—

RESET VALUE = $00

```
  15              8 7              0
┌─────────────────┬─────────────────┐
│ INDEX REGISTER  │ INDEX REGISTER  │
│    (HIGH) 205   │    (LOW)  212   │
└─────────────────┴─────────────────┘
         INDEX REGISTER 304
```

FIG.5

| | REGISTER PORTIONS | |
|---|---|---|
| | INDEX REGISTER (HIGH) 205 | INDEX REGISTER (LOW) 212 |
| OLD INSTRUCTIONS — REGISTER PORTION CAN BE MODIFIED BY OLD INSTRUCTIONS | NO | YES |
| REGISTER PORTION IS USED IN INDEXED ADDRESSING MODE BY OLD INSTRUCTIONS | YES | YES |
| NEW INSTRUCTIONS — REGISTER PORTION CAN BE MODIFIED BY NEW INSTRUCTIONS | YES | YES |
| REGISTER PORTION IS USED IN INDEXED ADDRESSING MODE BY NEW INSTRUCTIONS | YES | YES |

FIG.6

NEW INSTRUCTIONS

| MNEMONIC | FUNCTION | DESCRIPTION |
|---|---|---|
| AIX | ADD IMMEDIATE TO 16-BIT INDEX REGISTER | ADDS AN IMMEDIATE OPERAND TO THE 16-BIT INDEX REGISTER 304 FORMED BY THE CONCATENATION OF THE INDEX REGISTER (HIGH) 205 REGISTER PORTION AND THE INDEX REGISTER LOW 212 REGISTER PORTION. |
| CBEQ | COMPARE AND BRANCH IF EQUAL | COMPARES THE OPERAND FROM MEMORY WITH THE ACCUMULATOR 210 AND CAUSES A BRANCH IF THE RESULT IS ZERO. IN AN INDEXED ADDRESSING MODE, THE 16-BIT INDEX REGISTER 304 IS INCREMENTED AFTER THE COMPARE. |
| LDHX | LOAD 16-BIT INDEX REGISTER | LOADS AN IMMEDIATE VALUE OR LOADS THE CONTENTS OF THE SPECIFIED MEMORY LOCATION INTO THE 16-BIT INDEX REGISTER 304. |
| MOV | MOVE | MOVES A BYTE OF DATA FROM A SOURCE ADDRESS TO A DESTINATION ADDRESS. IN AN INDEXED ADDRESSING MODE, THE 16-BIT INDEX REGISTER 304 IS INCREMENTED AFTER THE MOVE. |
| PULH | PULL INDEX REGISTER (HIGH) FROM STACK | THE STACK POINTER REGISTER 208 IS INCREMENTED TO ADDRESS THE LAST OPERAND ON THE STACK. THE 8-BIT INDEX REGISTER (HIGH) 205 REGISTER PORTION IS THEN LOADED WITH THE CONTENTS OF THE ADDRESS POINTED TO BY STACK POINTER REGISTER 208. |
| TSX | TRANSFER STACK POINTER TO 16-BIT INDEX REGISTER | LOADS THE 16-BIT INDEX REGISTER 304 WITH ONE PLUS THE CONTENTS OF THE STACK POINTER REGISTER 208. |

FIG. 7

METHOD FOR PROVIDING AN EXTENSIBLE REGISTER IN THE FIRST AND SECOND DATA PROCESSING SYSTEMS

FIELD OF THE INVENTION

The present invention relates in general to a data processing system, and more particularly to a data processing system providing an extensible register and method thereof.

BACKGROUND OF THE INVENTION

A central processing unit (CPU) is generally the primary "brain" of a microcontroller integrated circuit (MCU). Aside from the CPU, an MCU normally includes one or more on-board peripherals or sections, such as memories, timers, and bus interfaces. The CPU however, is usually responsible for receiving and interpreting the software instructions used to control the MCU.

One particular CPU may be used on a variety of MCUs. If the same CPU is used on a variety of MCUs, these MCUs are generally considered to form a "family" (such as the MC68HC05 family of microcontrollers, available from Motorola, Inc. of Austin, Tex.). There are many advantages to using the same CPU on a variety of MCUs, both from the manufacturer's point of view and from the customer's point of view. One such advantage is software compatibility among MCUs in a family which uses the same CPU.

However, a problem arises when a new and more powerful version of the CPU is desired. One of the key decisions that must be made when designing a new and more powerful version of a CPU is determining whether or not to maintain "object code compatibility" with the old CPU. As it is being used in this document, the term "object code compatible" is an all or nothing characteristic of the new CPU. That is, either the new CPU is capable of running assembly language software written for the old CPU (and producing the same results), or it is not. Thus any differences between the old CPU and the new CPU must be completely transparent to an assembly language software program written for the old CPU.

There is a very significant advantage to designing a new CPU so that it is Object code compatible with the old CPU. The advantage is that the software that has been written for the old CPU can immediately be used for the new CPU. Thus customers who had been buying and using the old CPU can simply switch to using the new, more powerful CPU. And customers are assured that the software they were using with the old CPU will also work with the new CPU. Thus, there is no cost to the customer in having to modify or rewrite software in order to upgrade to a more powerful CPU. Designing a new and more powerful CPU that is object code compatible with an old CPU allows customers to upgrade to a more powerful CPU without having to incur the costs and risks associated with making software changes.

One of the ways to make a new CPU more powerful is to extend one or more registers by increasing the number of bits in the register. For example, increasing an index register from 8 to 16 bits. The index register is used in the indexed addressing mode. The indexed addressing mode is commonly used to access tables of data in memory. By increasing the index register from 8 to 16 bits, the memory space which is capable of being accessed and used by the. CPU in the indexed addressing mode is greatly increased. In fact, some customers have new products which absolutely require that the index register be extended from 8 to 16 bits in order to accommodate new product features.

Generally, in the indexed addressing mode, the value stored in the index register is used as a pointer to the beginning of a table of data values stored in sequential locations in memory. An offset value, which is generally included as part of an instruction, is then added to the value in the index register in order to access one specific location within the table of data values. However, there are a variety of other ways in which an index register may be used. Indexed addressing modes are well known to one of average skill in the art.

Simply making the index register in the new CPU 16 bits rather than 8 bits would destroy the object code compatibility because some software written for the old CPU would produce different results when executed by the new CPU. For example, a software program which incremented the index register when it contained the value $FF would cause the 8-bit index register in the old CPU to roll over to the value $00; whereas the same software program would cause the 16-bit index register in the new CPU to increment to the value $0100. Thus simply making the index register in the new CPU 16 bits rather than 8 bits destroys object code compatibility.

Although it is possible to increase or extend the size of a register while maintaining object code compatibility, it requires an excessive number of new instructions and the associated circuitry needed to implement the new instructions. By having a new duplicate instruction for each old instruction which uses or affects the extensible register, it is possible for a new CPU to extend the size of a register and still maintain object code compatibility. The first set of instructions is identical to the instructions of the old CPU (i.e. it only uses and affects 8 bits of the extensible register) and thus maintains object code compatibility. The second set of instructions is a duplicate set which performs the same functions as the first set of instructions, but the second set uses the full 16 bits of the extensible register.

In the case of the index register, there are a significant number of instructions which use or affect the index register. So adding a duplicate set of instructions for each instruction which uses or affects the index register would result in a prohibitively large addition of circuitry. Thus the goal is to add as little circuitry and cost as possible, yet to design a more powerful CPU which is object code compatible with the old CPU.

SUMMARY OF THE INVENTION

The previously mentioned needs are fulfilled and other advantages achieved with the present invention. In one form, the present invention is a data processing system providing an extensible register and method thereof.

In one embodiment, the present invention is a method for providing an extensible register in a data processing system. The method includes the step of providing a register which has a first register portion and a second register portion. The method also includes the step of receiving a first instruction which is object code compatible with a prior art data processing system. In response to receiving the first instruction, the first register portion is altered and the second register portion is not altered. The method includes the step of receiving a second instruction which has an opcode that is undefined in the prior art data processing system. In response to receiving the second instruction, the second register portion is altered. The method includes the step of receiving a third instruction which is object code compatible with the prior art data processing system. In response to receiving the third instruction, an operation is performed using both the first and second register portions.

The present invention will be understood by one skilled in the. art from the detailed description below in conjunction with the accompanying drawings.

DESCRIPTION OF THE PREFERRED EMBODIMENT

A more cost effective way to extend the length of a register while maintaining object code compatibility was needed. It was too costly to add a new 16-bit instruction for each of the old instructions that involved the index register. A less costly solution was needed.

As the term is being used in this application, an "extensible register" is a register which is capable of being extended in length. The term "size", when referring to a register, will be used synonymously with the term "length".

The present invention adds an upper byte to the existing index register. The present invention utilizes all of the instructions from the old CPU, as well as adding only a few new instructions which can modify the new upper byte of the index register. Note that all of the instructions from the old CPU have the exact same hexadecimal opcode; and the few new instructions have opcodes which were undefined in the old CPU.

It is important to note that in the present invention, some of the instructions from the old CPU use only 8 bits of the index register Oust like the old CPU); whereas other instructions from the old CPU have been modified to use all 16 bits of the index register (unlike the old CPU). But even though some of the old instructions use all 16 bits of the index register, object code compatibility is still maintained.

The new upper byte of the index register is initialized at reset to the value $00, and only the few new instructions are capable of altering the new upper byte of the index register. None of the old instructions that alter the index register have any effect on the new upper byte. However, it is important to note that all indexed addressing mode instructions, whether old or new, use the full 16 bits of the index register, including the new upper byte. Thus old indexed addressing mode instructions which use only 8 bits of the index register in the old CPU now use the full 16 bits of the index register in the new CPU 12.

However, object code compatibility is maintained because the new upper byte of the index register will always contain $00 if only old instructions are used. And all index addressing operations which use the 8-bit index register containing the value $xy produce identical results to the corresponding index addressing operations which use the full 16-bit index register containing the value $00xy.

If, however, a customer is willing to write new assembly code software using the new instructions, the customer can have the benefit of a full 16-bit index register and the increased memory space which can be accessed by the CPU in the indexed addressing mode.

Thus the present invention allows a new CPU 12 to be designed with an extensible index register. The new CPU 12 is object code compatible with the old CPU having an 8-bit index register, yet the index register of the new CPU 12 can be effectively extended to 16 bits when new instructions are used. As a consequence, the user gets to make the choice between using assembly code software written for the old CPU and having the functionality of an 8-bit index register, or writing new assembly code software for the new CPU 12 and having the functionality of a 16-bit index register.

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The term "bus" will be used to refer to a plurality of signals which may be used to transfer one or more various types of information, such as data, addresses, control, or status. The symbol "$" preceding a number indicates that the number is represented in its hexadecimal or base sixteen form.

DESCRIPTION OF THE FIGURES

Figure 1:
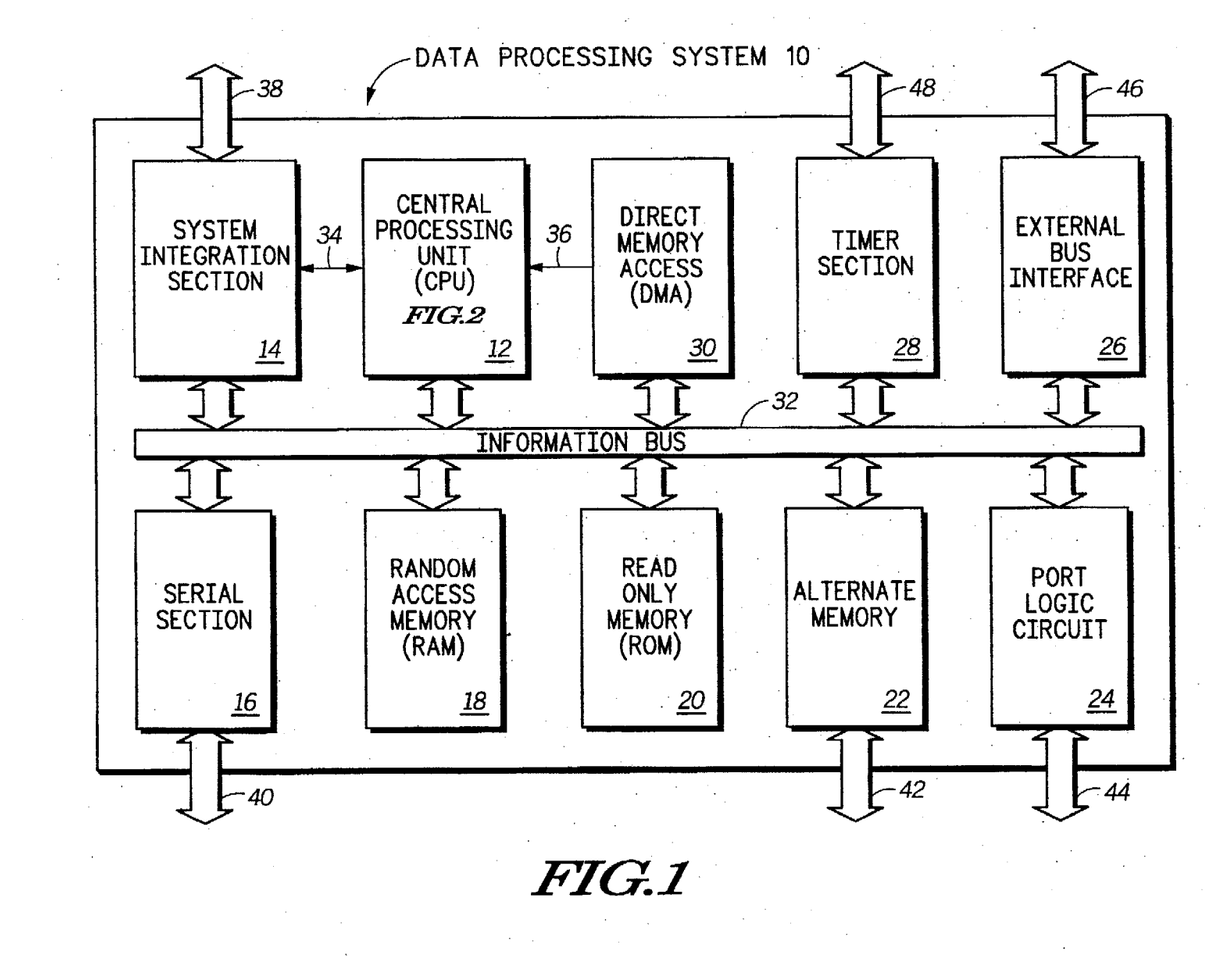
FIG. 1 illustrates, in block diagram form, a data processing system 10 in accordance with one embodiment of the present invention.

FIG. 1 illustrates one embodiment of a data processing system 10. Data processing system circuitry 10 includes a central processing unit (CPU) circuit 12, a system integration section of circuitry 14, a serial section of circuitry 16, random access memory (RAM) circuit 18, a read only memory (ROM) circuit 20, an other memory circuit 22 (e.g. electrically erasable programmable read only memory, EEPROM), a port logic circuit 24, an external bus interface circuit 26, a timer section of circuitry 28, and a direct memory access (DMA) circuit 30.

Each of CPU 12, a system integration circuit 14, serial circuit 16, RAM 18, ROM 20, other memory circuit 22, port logic circuit 24, external bus interface circuit 26, timer circuit 28, and DMA 30 is bidirectionally coupled to an Information Bus 32. CPU 12 and system integration section 14 are bi-directionally coupled via a bus 34. Similarly, CPU 12 is coupled to DMA 30 via a bus 36.

System integration section 14 can receive and transmit signals external to data processing system 10 by way of integrated circuit pins 38. Serial section 16 can receive and transmit signals external to data processing system 10 by way of integrated circuit pins 40. Depending upon the type of memory, other memory 22 may optionally receive and transmit signals external to data processing system 10 by way of integrated circuit pins 42. Port logic 24 can receive and transmit signals external to data processing system 10 by way of integrated circuit pins 44. External bus interface 26 can receive and transmit signals external to data processing system 10 by way of integrated circuit pins 46. And timer section 28 can receive and transmit signals external to data processing system 10 by way of integrated circuit pins 48.

The embodiment of data processing system 10 which is shown in FIG. 1 illustrates one particular microcontroller within a family of microcontrollers. Because microcontrollers in the same family generally have a plurality of differing on-board peripherals, FIG. 1 provides only one embodiment of data processing system 10. For example, other embodiments of data processing system 10 may not have ROM 20, external bus interface 26, or DMA 30. In fact, other embodiments of data processing system 10 may have fewer, more, or different peripherals than those illustrated in FIG. 1.

Figure 2:
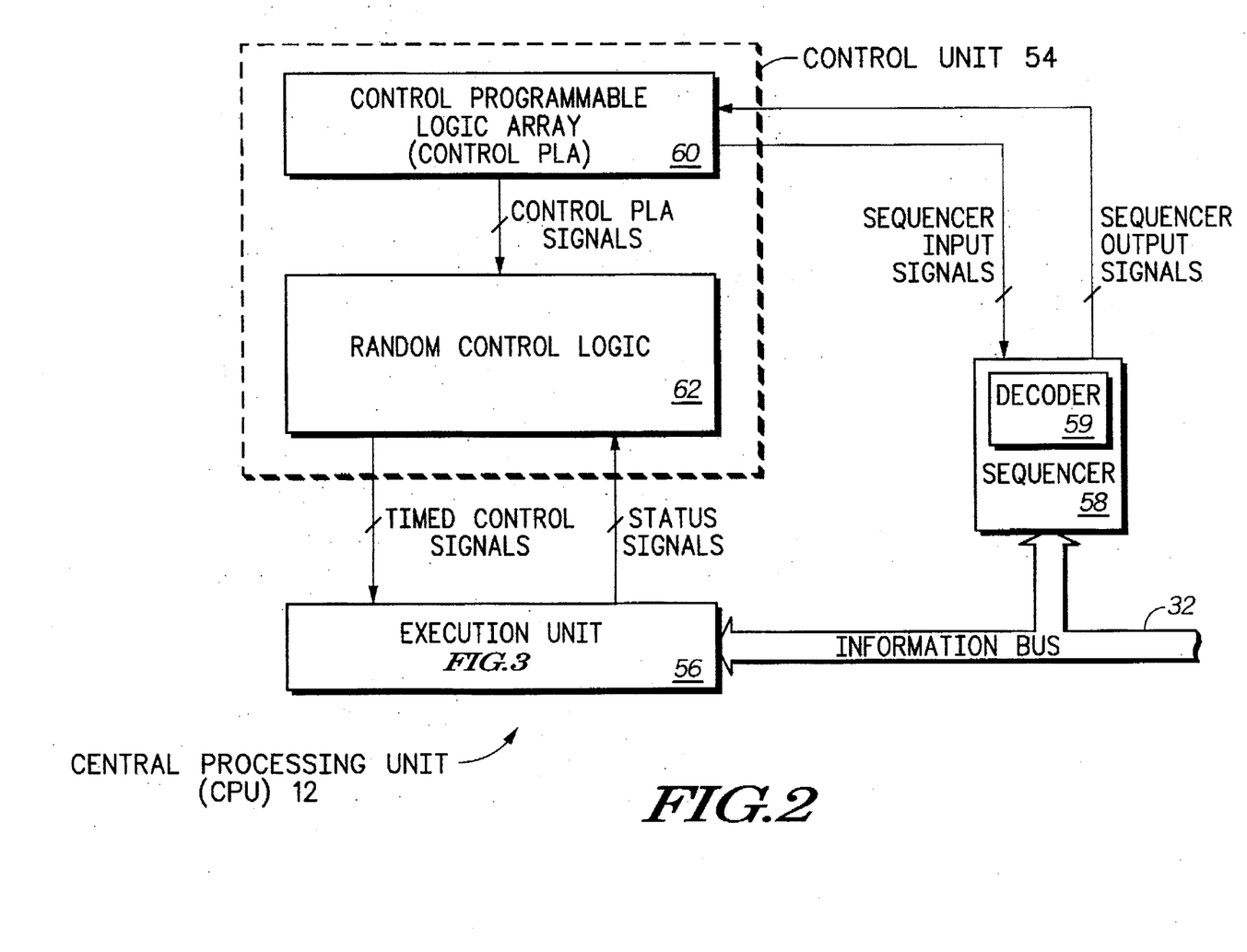
FIG. 2 illustrates, in block diagram form, a central processing unit (CPU) 12 of FIG. 1 in accordance with one embodiment of the present invention.

FIG. 2 illustrates, in block diagram form, a central processing unit (CPU) 12 of FIG. 1 in accordance with one embodiment of the present invention. As illustrated in FIG. 2, CPU 12 can be conceptually divided into three major portions, namely a control unit 54, an execution unit 56, and a sequencer 58.

Control unit 54 includes a control programmable logic array (control PLA) circuit 60 and a random control logic circuit 62. In control unit 54, control PLA 60 is connected to random control logic circuit 62 to transfer a plurality of signals, collectively labeled Control PLA Signals. Random control logic 62 is coupled to execution unit 56 to transfer a plurality of Timed Control Signals and to receive a plurality of Status Signals. Control PLA 60 is coupled to sequencer 58 to transfer signals labeled Sequencer Input Signals, and to receive signals labeled Sequencer Output Signals. Sequencer 58 is coupled to information bus 32 in order to receive instructions. Execution unit 56 is bi-directionally coupled to information bus 32. Some embodiments of sequencer 58 may include decoder 59.

Figure 3:
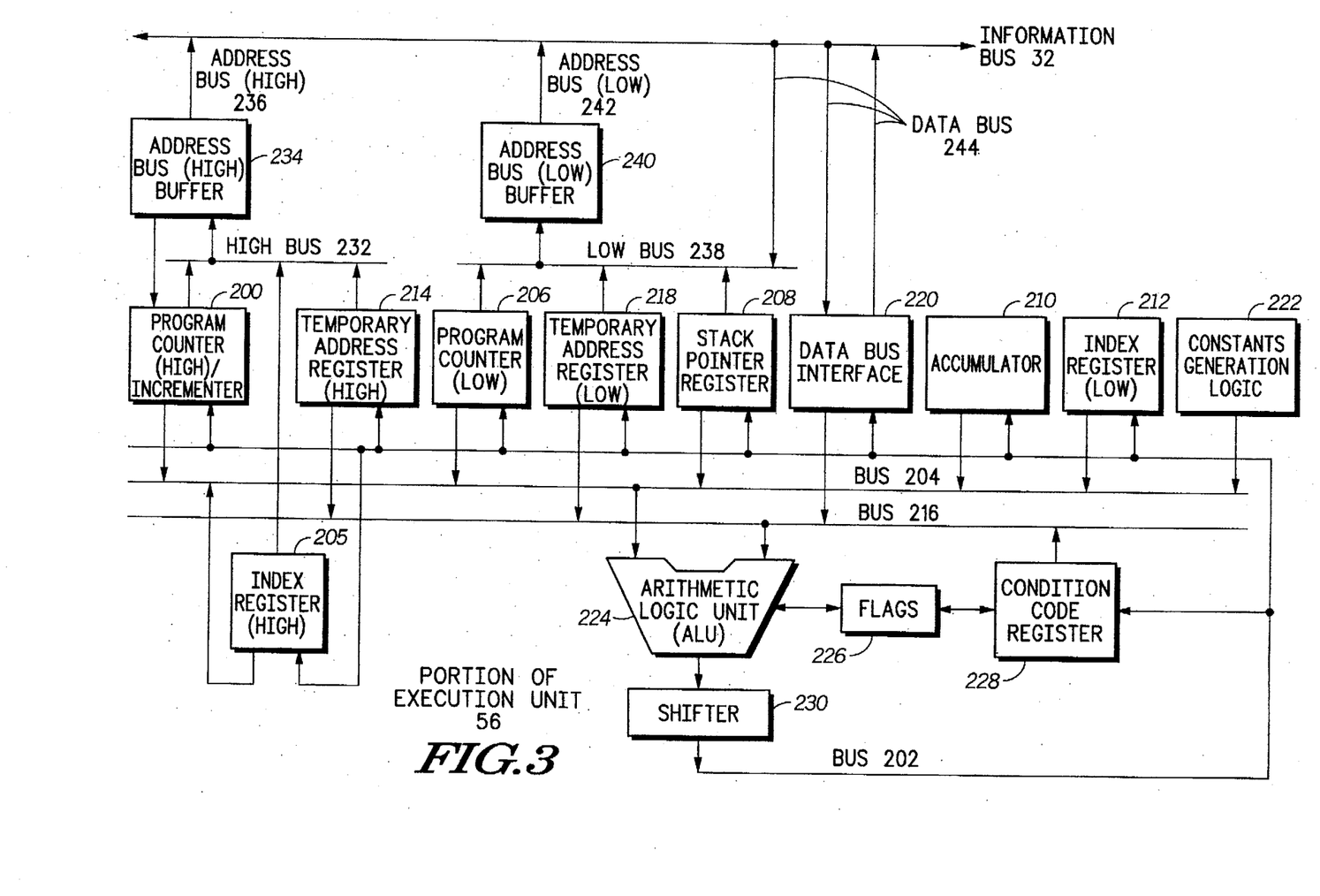
FIG. 3 illustrates, in block diagram form, a portion of an execution unit 56 of FIG. 2 in accordance with one embodiment of the present invention.

FIG. 3 illustrates one embodiment of a portion of execution unit 56 of FIG. 2. Program counter (high)/incrementer register circuit 200 receives information from bus 202 and provides information to bus 204. Index register (high) circuit 205 receives information from bus 202 and provides information to bus 204. Program counter flow) register circuit 206 receives information from bus 202 and provides information to bus 204. Stack pointer register circuit 208 receives information from bus 202 and provides information to bus 204. Accumulator register circuit 210 receives information from bus 202 and provides information to bus 204. Index register (low) circuit 212 receives information from bus 202 and provides information to bus 204.

Temporary address register (high) circuit 214 receives information from bus 202 and provides information to bus 216. Temporary address register (low) circuit 218 receives information from bus 202 and provides information to bus 216. Data bus interface circuitry 220 receives information from bus 202 and provides information to bus 216. Constants generation logic circuit 222 provides information to bus 204.

Arithmetic logic unit (ALU) 224 receives data from bus 204 and from bus 216. ALU 224 is bi-directionally coupled to flags circuitry 226. Flags circuitry 226 is bi-directionally coupled to condition code register 228. Condition code register 228 receives information from bus 202 and provides information to bus 216. The output of ALU 224 is coupled to shifter circuitry 230. Shifter 230 provides information to bus 202.

Program counter (high)/incrementer register 200, index register (high) 205, and temporary address register (high) 214 each provide information to high bus 232. Address bus (high) buffer circuitry 234 receives information from high bus 232 and provides information to program counter (high) /incrementer register 200. Address bus (high) buffer 234 is coupled to address bus (high) 236. Address bus (high) 236 is coupled to information bus 32.

Program counter (low) register 206, temporary address register (low) 218, and stack pointer register 208 each provide information to low bus 238. Address bus (low) buffer circuitry 240 receives information from low bus 238. Address bus (low) buffer 240 is coupled to address bus (low) 242. Address bus (low) 242 is coupled to information bus 32.

Low bus 238 receives information from data bus 244. Data bus interface 220 receives information from and provides information to data bus 244. Data bus 244 is coupled to information bus 32. In one embodiment of the present invention, address bus (high) 236, address bus (low) 242, and data bus 244 are actually part of information bus 32.

Figure 4:
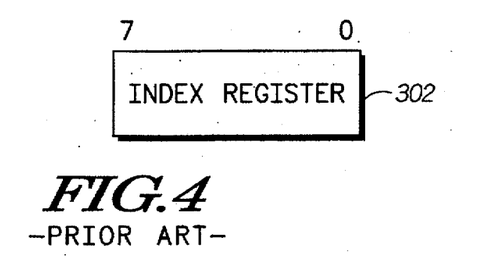
FIG. 4 illustrates, in block diagram form, an 8-bit prior art index register 302.

FIG. 4 illustrates, in block diagram form, an 8-bit prior art index register 302.

Figure 5:
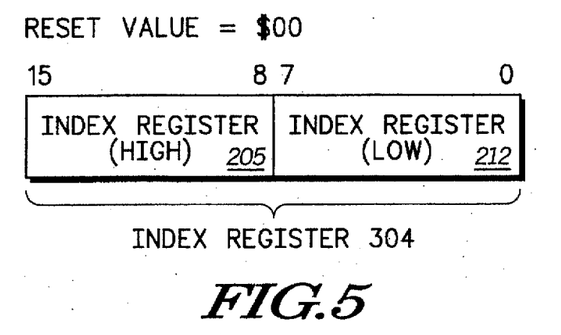
FIG. 5 illustrates, in block diagram form, a 16-bit index register 304 which is formed by the concatenation of the index register (high) circuit 205 and the index register (low) circuit 212.

FIG. 5 illustrates, in block diagram form, a 16-bit index register 304 which is formed by the concatenation of the index register (high) circuit 205 and the index register (low) circuit 212. The index register (high) circuit 205 and the index register (low) circuit 212 are each an 8-bit register portion of the 16-bit index register 304. Both the index register (high) circuit 205 and the index register (low) circuit 212 are included in execution unit 56 in FIG. 3.

Figure 6:
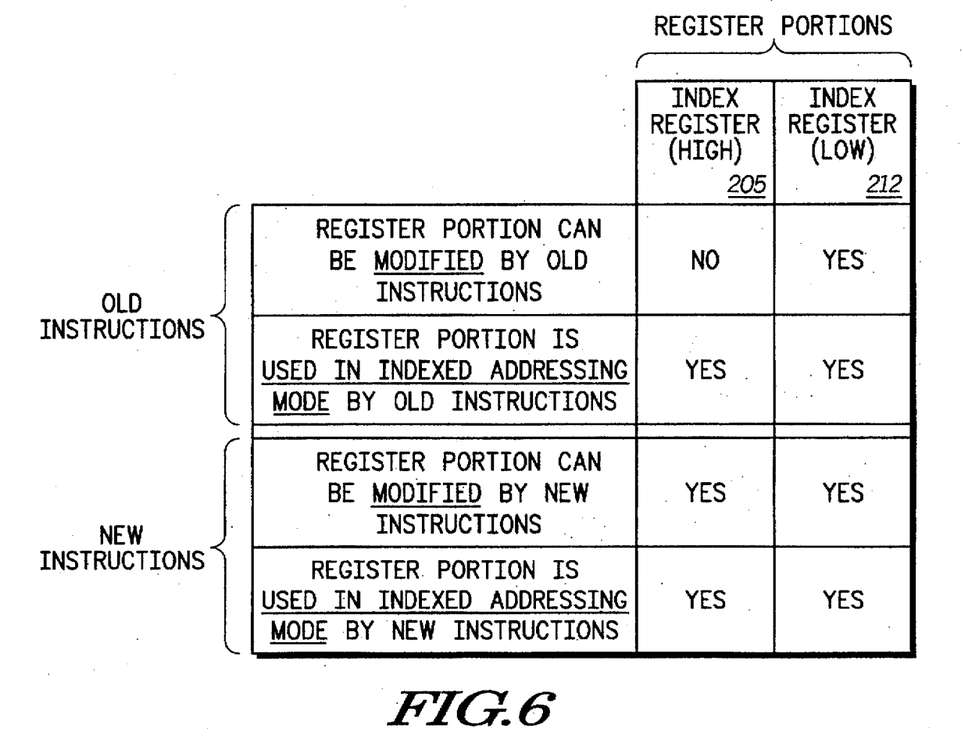
FIG. 6 illustrates, in tabular form, the affect which certain groups of old and new instructions have on index register portions 205 and 212.

FIG. 6 illustrates, in tabular form, the affect which certain groups of old and new instructions have on index register portions 205 and 212 in the new CPU 12.

Figure 7:
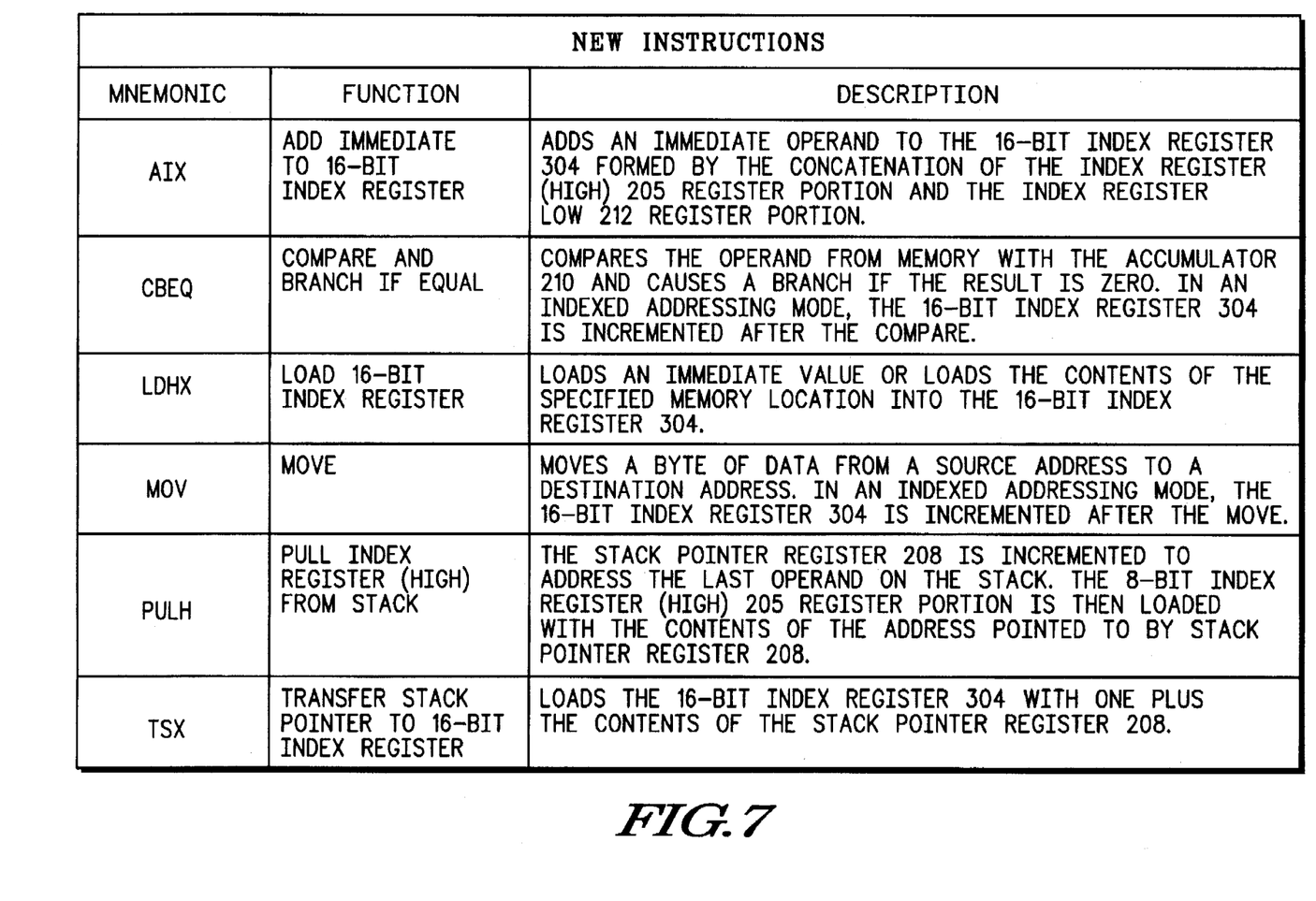
FIG. 7 illustrates, in tabular form, a description of the new instructions which are capable of modifying index register (high) 205.

FIG. 7 illustrates, in tabular form, a description of the new instructions which are capable of modifying index register (high) 205 in new CPU 12.

OPERATION OF THE PREFERRED EMBODIMENT

The present invention allows a new, more powerful CPU to be designed which is object code compatible with an old CPU, and yet which adds as little circuitry and cost as possible. The new CPU 12 provides an extensible register, which in one embodiment is an index register which can be extended from 8 bits to 16 bits. The extensible index register in the new CPU 12 can function like an 8-bit register in order to maintain object code compatibility; but it can also be extended and used as a 16-bit register to increase the capabilities of the indexed addressing mode in the new CPU 12.

FIG. 6 illustrates, in tabular form, the affect which certain groups of old and new instructions have on index register portions 205 and 212 in the new CPU 12. "Old" instructions are instructions which were defined for the old CPU and which the old CPU was capable of executing. Thus every instruction in the instruction set for the old CPU is an "old" instruction. "New" instructions are instructions which are defined for the new CPU 12 and which the new CPU 12 is capable of executing, but which were undefined for the old CPU. The instruction set for the new CPU 12 includes all of the "old" instructions and any "new" instructions which were added to increase the capabilities of the new CPU 12.

Under the heading of "OLD INSTRUCTIONS", there are two statements regarding the effect which old instructions have on the index register portions 205 and 212 in the new CPU 12. Index register (high) 205 cannot be modified by old instructions; but index register (low) 212 can be modified by old instructions. And both index register (high) 205 and index register (low) 212 are used as a concatenated index register 304 in indexed addressing mode.

Under the heading of "NEW INSTRUCTIONS", there are two statements regarding the effect which new instructions have on the index register portions 205 and 212 in the new CPU 12. Both index register (high) 205 and index register (low) 212 can be modified by new instructions. And both index register (high) 205 and index register (low) 212 are used as a concatenated index register 304 in indexed addressing mode.

The new CPU 12 has added an upper byte to the existing index register, namely index register (high) 205, while still maintaining object code compatibility. The old CPU had an index register 302 (see FIG. 4) which directly corresponded to the index register (low) circuit 212 in new CPU 12 (see FIG. 3). However, unlike the old CPU, the new CPU 12 has an additional index register (high) circuit 205 (see FIG. 3) which can be concatenated with the index register (low) circuit 212 in order to effectively form a 16-bit index register 304 (see FIG. 5).

The new CPU 12 utilizes all of the instructions from the old CPU, as well as adding only a few new instructions which can modify the new upper byte of index register 304 (see FIG. 7). Note that all of the old instructions have the exact same hexadecimal opcode as in the old CPU; and the new instructions have opcodes which were undefined in the old CPU.

In one embodiment of the present invention, the old CPU is a member of the MC68HC05 family of microcontrollers, available from Motorola, Inc. of Austin, Tex. A complete list of old instructions is available in various MC68HC05 family user manuals which have been published by Motorola, Inc. As an example, some of the old instructions which were capable of modifying the index register 302 (see FIG. 4) are as follows: the "DECX" instruction which subtracts one from the contents of the index register 302; the "INCX" instructions which adds one to the contents of the index register 302; the "LDX" instruction which loads an immediate value or the contents of the specified memory location into the index register 302; the "LSLX" instruction which shifts all bits of the index register 302 one place to the left and shifts a zero into bit zero; the "NEGX" instructions which replaces the contents of the index register 302 with its twos complement value; and the "TAX" instruction which loads the index register with the contents of the accumulator.

It is important to understand the results that are produced by allowing the old and new instructions to affect the index register portions 205 and 212 in the manner illustrated in FIG. 6. In new CPU 12, some of the old instructions use only 8 bits of the index register (just like the old CPU); whereas other old instructions have been modified to use all 16 bits of the index register (unlike the old CPU). But even though some of the old instructions use all 16 bits of the index register, object code compatibility is still maintained, as will now be explained.

The new upper byte of the index register, namely index register (high) 205, is initialized at reset to the value $00; and only the few new instructions illustrated in FIG. 7 are capable of altering the new upper byte of the index register (see FIG. 5). None of the old instructions that alter the index register have any effect on the new upper byte. Thus any software which was written to execute on the old CPU will have no affect on the new upper byte of the index register. So when software written for the old CPU (and thus using only old instructions) is executed by the new CPU 12, the new upper byte of the index register will never be modified or altered and will always remain at the reset value $00.

However, it is important to note that all indexed addressing mode instructions that do not modify the index register, whether old or new, use the full 16 bits of index register 304, including the new upper byte. Thus old indexed addressing mode instructions which used only an 8-bit index register in the old CPU now use the full 16 bits of index register 304 in the new CPU 12.

However, object code compatibility is maintained because the new upper byte of the index register will always contain $00 if only old instructions are used. The 8-bit value $xy and the 16-bit value $00xy produce the same result when used to calculate an effective address in an indexed addressing mode instruction which does not modify the index register. All index addressing operations in the old CPU which did not modify the index register and which used only an 8-bit index register containing the value $xy produce identical results to the corresponding index addressing operations in the new CPU 12 which use the full 16-bit index register containing the value $00xy. Thus object code compatibility is maintained even though some old instructions now use a 16-bit register rather than an 8-bit register.

If, however, a customer is willing to write new software using the new instructions, the customer can have the benefit of a full 16-bit index register and the corresponding increase in the size of tables in memory which can be accessed by the CPU in the indexed addressing mode. The customer can use the new instructions illustrated in FIG. 7 in order to modify the $00 value originally stored in the upper byte of index register 304.

Note that alternate embodiments of the present invention may not require the upper byte to have a reset value of $00, but may instead require the user to write a $00 value to the upper byte if the software requires it. For example, software which never uses the index register 304 may have no need to write a $00 value to index register 304.

FIG. 7 illustrates, in tabular form, a description of the new instructions which are capable of modifying index register (high) 205 in new CPU 12. More, fewer, or different new instructions may be used in alternate embodiments of the present invention. The present invention does not place any restrictions or limitations on the type or functionality of any new instructions. However, it is desirable to have at least one instruction which the user can use to modify the value stored in the new upper byte of the index register.

Note that there are two types of new instructions which modify the upper byte of the index register in new CPU 12. The first type of new instruction is capable of modifying only the upper byte and has no effect on the lower byte (e.g. the PULH instruction). The second type of new instruction is capable of modifying both the upper byte and the lower byte (e.g. the AIX, CBEQ, LDHX, MOV, and TSX instructions).

The present invention only places two restrictions on how new CPU 12 executes old instructions: (1) for old instructions which modified the index register 302 in the old CPU, index register (low) 205 behaves in the same manner and ends up storing the same value as index register 302 in order to preserve object code compatibility; and (2) all of the indexed addressing mode instructions, new and old alike, use all 16 bits of index register 304 in order to eliminate the need to duplicate all of the indexed addressing mode instructions.

The operation of the circuit implementation of the present invention will now be discussed.

Referring to FIG. 1, data processing system 10 illustrates one possible MCU within an MCU family. Because MCUs in the same family generally have different on-board peripherals, other embodiments of data processing system 10 may not have ROM 20, may not have external bus interface 26, and may not have DMA 30. In fact, other embodiments of data processing system 10 may have fewer, more, or different peripherals than those illustrated in FIG. 1.

During operation of the embodiment of the invention illustrated in FIG. 1, system integration section 14 is used to perform a variety of functions for data processing system 10. Generally, system integration section 14 provides a plurality of control information to both enable and disable operation, to provide timing control, and to perform exception handling requirements for data processing system 10. System integration section 14 may interface directly with CPU 12 via bus 34, an external user via the plurality of integrated circuit pins 38, and with each of a remaining plurality of components of data processing system 10 via information bus 32.

In data processing system 10, DMA 30 allows direct communication of data between memory internal to data processing system 10 and a plurality of peripheral devices (not shown). DMA 30 may be optionally implemented on data processing system 10 when a user requires a fast memory access method. Use and implementation of direct memory access circuits are well known in the data processing art and will not be discussed in further detail.

Timer section 28 executes a plurality of timing functions which are based on a flee-running 16-bit counter. When enabled through the plurality of integrated circuit pins 48, timer section 28 may function to perform an input-capture function, an output-compare functions, a real-time interrupt, or a computer operating properly watchdog function. Implementation and use of each of these functions is well known in the data processing art and will not be discussed in further detail. A modified form of timer section 28 is implemented on the Motorola MC68HC11 microcontroller which is commercially available from Motorola, Inc. of Austin, Tex.

External bus interface 26 controls receipt and transmission of address and data values between an external user or external peripheral device and data processing system 10. External bus interface 26 communicates a plurality of address and data values to a remaining portion of data processing system 10 via information bus 32.

Port logic circuit 24 controls operation and functionality of each one of the plurality of integrated circuit pins 44. Port logic circuit 24 may configure the plurality of integrated circuit pins 44 to function as general purpose input/output pins in a first mode of operation. In a second mode of operation, port logic circuit 24 may use each of the plurality of integrated circuit pins 44 to communicate multiplexed address and data information.

RAM 18, ROM 20, and other memory 22 may be used to store information such as assembly code software instructions, data values, and address values, which can then be used by data processing system 10.

Serial section 16 communicates serial digital data between data processing system 10 and an external user or an external peripheral device. The serial digital data and appropriate control signals are communicated via the plurality of integrated circuit pins 40.

Referring to FIG. 2, new CPU 12 is illustrated in more detail. CPU 12 is basically divided into three major portions. The three major portions include control unit 54, execution unit 56, and sequencer 58. Sequencer 58, in conjunction with control PLA 60, functions as a state machine by determining the next state of new CPU 12 based upon both the present state of new CPU 12 and upon the present instruction received by way of information bus 32.

Some embodiments of the present invention may include decoder 59. Decoder 59 may be part of sequencer 58 (as shown), may alternately be coupled between sequencer 58 and control PLA 60, or may alternately be coupled between information bus 32 and sequencer 58. Decoder 59 is used to decode the instruction opcodes transferred across information bus 32. If decoder 59 is included in sequencer 58, the output of decoder 59 is transferred to control PLA 60 using the Sequencer Output Signals.

During operation of new CPU 12, sequencer 58 receives instructions from information bus 32. Sequencer 58 determines the order in which instruction should be provided to control unit 54. The instruction is provided to control PLA 60 of control unit 54 via the Sequencer Output Signals. Upon receipt of the instruction, control PLA 60 provides the plurality of Control PLA Signals to random control logic 62. The logic states of the Control PLA Signals is determined by the logic states of the Sequencer Output Signals received by control PLA 60.

Control PLA 60 also provides the Sequence Input Signals to sequencer 58 in order to provide feedback information regarding the present internal state of new CPU 12 and regarding the progress being made in executing the present instruction. Random control logic 62 provides timing control information to each of the plurality of Control PLA Signals. Random control logic 62 outputs the plurality of Timed Control signals to execution unit 56.

Note that control PLA 60 could be implemented as any type of programmable array, including any type of memory or any type of programmable logic array. Control PLA 60 could even be implemented as random logic and combined with random control logic 62.

A programmable logic array (PLA) generally requires less semiconductor area than a read only memory (ROM); however, it is simpler and faster to customize a ROM than it is to customize a PLA. Because the same control PLA 60 will be used for different versions of new CPU 12, it may be advantageous to implement control PLA 60 as a PLA in order to conserve semiconductor area.

The Timed Control Signals are used to control execution unit 56. Execution unit 56, under control of the Timed Control Signals, performs each of the functions necessary to execute the instruction. Information bus 32 is used as an address and data path to read and write the registers located in execution unit 56. Execution unit 56 provides the plurality of Status Signals to random control logic 62 in order to indicate the present state of new CPU 12. Random control logic 62 uses the logic states of the Status Signals to help determine the logic states of the Timed Control Signals.

In general, new CPU 12 receives and decodes instructions, provides a plurality of control signals, executes the instruction in response to the plurality of control signals, and then provides feedback information regarding execution of the instruction such that a new instruction may be received and executed.

Referring to FIG. 3, a portion of execution unit 56 is illustrated in more detail. The details of how the Timed Control Signals control execution unit 56 are not illustrated. However, the Timed Control Signals are used to control execution unit 56 in the same manner as the prior art. That is, the Timed Control Signals are used to control the flow of information across the various buses, and to and from the various registers, buffers, and other circuits illustrated in FIG. 3.

The indexed addressing mode will now be discussed. Many CPUs have the capability of executing instructions in an indexed addressing mode. Although the indexed addressing mode can vary somewhat from CPU to CPU, some of the general principles remain fairly standard: The indexed addressing mode is often used as a way of conveniently accessing tables of information stored in memory.

Generally, in the indexed addressing mode, the value stored in an index register is used as a pointer to the beginning of a table of data values stored in sequential locations in memory. An offset value, which is generally included as part of an instruction, is then added to the value in the index register in order to access one specific location within the table of data values. Alternatively, the offset value can be used as the pointer to the beginning of a table of data values, and the index register can contain the displacement into the table. There are a variety of other ways in which an index register may be used. Indexed addressing modes are well known to one of average skill in the art.

Often there are various types of indexed addressing within the indexed addressing mode. For convenience, these various types of indexed addressing will be called "sub-modes" within the indexed addressing mode. As an example, the various "submodes" within the indexed addressing mode of the MC68HC05 microcontroller will be described. The MC68HC05 microcontroller has three "sub-modes" within the indexed addressing mode: (1) no offset; (2) 8-bit offset; and (3) 16-bit offset. These three sub-modes within the indexed addressing mode of the MC68HC05 microcontroller will now be described.

In the first "no offset" sub-mode, the value in the index register is used directly as the effective address for the instruction. Thus in the first sub-mode, each instruction is a one-byte instruction in which the one byte is the instruction opcode.

In the second "8-bit offset" sub-mode, an 8-bit offset value is included as part of the instruction. This 8-bit offset value is added to the value in the index register in order to generate the effective address for the instruction. Thus in the second sub-mode, each instruction is a two-byte instruction in which the first byte is the instruction opcode and the second byte is an 8-bit offset value.

In the third "16-bit offset" sub-mode, a 16-bit offset value is included as part of the instruction. This 16-bit offset value is added to the value in the index register in order to generate the effective address for the instruction. Thus in the third sub-mode, each instruction is a three-byte instruction in which the first byte is the instruction opcode, and the second and third bytes together are a 16-bit offset value.

In one embodiment, new CPU 12 has the same three submodes within the indexed addressing mode as the MC68HC05 microcontroller; and the old instructions executed by new CPU 12 are all of the of instructions from the MC68HC05 microcontroller. Alternate embodiments of the present invention may use more, fewer, or different sub-modes within the indexed addressing mode.

In addition, alternate embodiments of the present invention may define the indexed addressing mode in a different manner. In fact, the present invention may be used for any addressing mode which uses a register value as part of the calculation of an effective address for an instructions.

The operation of execution unit 56 during instructions using the indexed addressing mode will now be discussed (see FIG. 3). Note that only the steps used to generate the effective address will be discussed in detail. Other steps, such as incrementing the program counter (high)/ incrementer register 200 and the program counter (low) register 206, are also performed during instructions using the indexed addressing mode. However, these other steps will not be discussed in detail.

In the first "no offset" sub-mode, the value in the index register is used directly as the effective address for the instruction. Regardless of whether or not the instruction is an old instruction or a new instruction, both bytes or portions of index register 304 are used, namely index register (high) 205 and index register (low) 212.

Because index register (low) 212 has no direct access to information bus 32, the first step is to transfer the value stored in index register (low) 212 into temporary address register (low) 218. Because bus 202 is the only input path to temporary address register (low) 218, it is necessary to route the value stored in index register (low) 212 through ALU 224. The value stored in index register (low) 212 is transferred to an input of ALU 224 across bus 204. Each signal included in bus 216 is precharged to a logic level one. ALU 224 inputs all binary ones from bus 216 and then inverts the logic levels to all binary zeros. Thus one input to ALU 224 is the value from index register (low) 212, and the other input to ALU 224 is zero. ALU 224 thus adds zero to the value from index register (low) 212. Then ALU 224 transfers the restfit of the addition into temporary address register (low) 218 across bus 202.

Next, the value stored in temporary address register (low) 218 is transferred to address bus (low) buffer 240 across low bus 238. At the same time, the value stored in index register (high) 205 is transferred to address bus (high) buffer 234 across high bus 232. The effective address is thus a 16-bit address which is formed by the concatenation of the value from index register (high) 205 and the value from index register (low) 212. The 16-bit effective address is transferred out of new CPU 12 across information bus 32.

In the second "8-bit offset" sub-mode, an 8-bit offset value is included as part of the instruction. This 8-bit offset value is added to the value in index register 304 in order to generate the effective address for the instruction. Regardless of whether or not the instruction is an old instruction or a new instruction, both bytes or portions of index register 304 are used, namely index register (high) 205 and index register (low) 212.

The 8-bit offset, which was included as part of the instruction, is transferred from information bus 32 to data bus 244, then to data bus interface 220, then to bus 216, and then to the input of ALU 224. Meanwhile, the value stored in index register (low) 212 is transferred to the other input of ALU 224 across bus 204. ALU 224 adds together the 8-bit offset and the value from index register (low) 212, and then transfers the result into temporary address register (low) 218 across bus 202. An internal carry signal (not shown) is generated by ALU 224. The logic state of the internal carry signal is determined by whether or not the addition resulted in a carry out. The logic state of the internal carry signal is stored internally by new CPU 12.

Next, the internal carry (either a binary zero or a binary one) is added to the value stored in the index register (high) 205. The value stored in index register (high) 205 is transferred to an input of ALU 224 across bus 204. Each signal included in bus 216 is precharged to a logic level one. ALU 224 inputs all binary ones from bus 216 and then inverts the logic levels to all binary zeros. Thus one input to ALU 224 is the value from index register (high) 205, and the other input to ALU 224 is zero. ALU 224 then adds the internal carry to zero and to the value from the index register (high) 205. ALU 224 then transfers the result into temporary address register (high) 214 across bus 202.

Then the contents of temporary address register (high) 214 is transferred to address bus (high) buffer 234 across high bus 232. At the same time, the contents of temporary address register (low) 218 is transferred to address bus (low) buffer 240 across low bus 238. The effective address is thus a 16-bit address which is formed by adding an 8-bit offset to the concatenation of the value stored in index register (high) 205 and the value stored in index register (low) 212. The 16-bit effective address is transferred out of new CPU 12 across information bus 32.

In the third "16-bit offset" sub-mode, a 16-bit offset value is included as part of the instruction. This 16-bit offset value is added to the value in the index register in order to generate the effective address for the instruction. Regardless of whether or not the instruction is an old instruction or a new instruction, both bytes or portions of index register 304 are used, namely index register (high) 205 and index register (low) 212.

The upper byte of the 16-bit offset, which was included as part of the instruction, is transferred from information bus 32 to data bus 244, then to data bus interface 220, then to bus 216, and then to the input of ALU 224. Each signal included in bus 204 is precharged to a logic level one. ALU 224 inputs all binary ones from bus 204 and then inverts the logic levels to all binary zeros. Thus one input to ALU 224 is the upper byte of the 16-bit offset, and the other input to ALU 224 is zero. ALU 224 then adds the upper byte of the 16-bit offset to zero, and transfers the result into temporary address register (high) 214 across bus 202.

Next, the lower byte of the 16-bit offset, which was included as part of the instruction, is transferred from information bus 32 to data bus 244, then to data bus interface 220, then to bus 216, and then to the input of ALU 224. Meanwhile, the value stored in index register (low) 212 is transferred to the other input of ALU 224 across bus 204. ALU 224 adds together the lower byte of the 16-bit offset and the value from index register (low) 212, and then transfers the result into temporary address register (low) 218 across bus 202. An internal carry signal (not shown) is generated by ALU 224. The logic state of the internal carry signal is determined by whether or not the addition resulted in a carry out. The logic state of the internal carry signal is stored internally by new CPU 12.

Next, the internal carry (either a binary zero or a binary one) and the upper byte of the 16-bit offset are added to the value stored in the index register (high) 205. The value stored in index register (high) 205 is transferred to an input of ALU 224 across bus 204. Likewise, the upper byte of the 16-bit offset, stored in temporary address register (high) 214, is transferred to the other input of ALU 224 across bus 216. Thus one input to ALU 224 is the value from index register (high) 205, and the other input to ALU 224 is the upper byte of the 16-bit offset. ALU 224 then adds together the internal carry, the value from the index register (high) 205, and the upper byte of the 16-bit offset. ALU 224 then transfers the result into temporary address register (high) 214 across bus 202.

Then the contents of temporary address register (high) 214 is transferred to address bus (high) buffer 234 across high bus 232. At the same time, the contents of temporary address register (low) 218 is transferred to address bus (low) buffer 240 across low bus 238. The effective address is thus a 16-bit address which is formed by adding a 16-bit offset to the concatenation of the value stored in index register (high) 205 and the value stored in index register (low) 212. The 16-bit effective address is transferred out of new CPU 12 across information bus 32.

SUMMARY AND SOME ALTERNATE EMBODIMENTS

In summation, the present invention allows a new CPU 12 to be designed with an extensible index register 304. The new CPU 12 is object code compatible with the old CPU having an 8-bit index register, yet the index register of the new CPU 12 can be effectively extended to 16 bits when new instructions are used. As a consequence, the user gets to make the choice between using assembly code software written for the old CPU and having the functionality of an 8-bit index register, or writing new assembly code software for the new CPU 12 and having the functionality of a 16-bit index register.

While the present invention has been illustrated and described with reference to specific embodiments, further modifications and improvements will occur to those skilled in the art. For example, in alternate embodiments of the present invention, alternate architectures for data processing system 10, new CPU 12, and execution unit 56 may be used. The architectures illustrated in FIG. 1, FIG. 2, and FIG. 3 are just possible architectures that may be used. For example, execution unit 56 may have any number or type of registers. Likewise, the invention may be used to make any size register extensible. For example, a 16-bit register may be extended to 32 bits in an alternate new CPU 12. Also, execution unit 56 may have different bus sizes or different bus routing.

The present invention may be used with types of registers other than index registers. In addition, the present invention may be used to make a register extensible in any type of digital data processor, not just in a central processing unit (CPU).

Independent of the present invention, the performance of a data processing system 10 may also be increased by a variety of techniques which independently affect object code compatibility. For example, in addition to utilizing the present invention, some data processing systems 10 further increase performance by reducing the number of cycles that are required to perform one or more instructions within new CPU 12. If a new CPU 12 changes the number of cycles required to execute one or more instructions, then timing sensitive assembly language software for the old CPU may need to be modified. Thus, although the present invention maintains object code compatibility between the old CPU and the new CPU 12, other performance improvements to new CPU 12, unrelated to the present invention, may affect object code compatibility in some embodiments.

It is to be understood, therefore, that this invention is not limited to the particular forms illustrated and that it is intended in the appended claims to cover all modifications that do not depart from the spirit and scope of this invention.

I claim:

1. A method for providing an extensible register in a first data processing system, the method comprising the steps of:

identifying an instruction set for the first data processing system, the first data processing system executing at least a portion of an existing instruction set associated with a second data processing system;

providing, in the first data processing system, a register which has a first register portion and a second register portion, wherein the second register portion was not provided in the second data processing system;

receiving, in the first data processing system, a first instruction which is object code compatible with the second data processing system;

in response to receiving the first instruction, altering the first register portion and not altering the second register portion;

receiving, in the first data processing system, a second instruction which has an opcode that is undefined in the second data processing system;

in response to receiving the second instruction, altering the second register portion;

receiving, in the first data processing system, a third instruction which is object code compatible with the second data processing system; and in response to receiving the third instruction, performing an operation using both the first and second register portions.

2. A method as in claim 1, further comprising the step of:

resetting the second register portion to a zero value when the first data processing system is reset.

3. A method as in claim 1, wherein said step of performing the operation comprises the step of:

calculating an effective address.

4. A method as in claim 3, wherein the first register portion is one byte in length and the second register portion is one byte in length.

5. A method as in claim 3, further comprising the step of:

using a concatenation of the first and second register portions to perform all instructions which use the indexed addressing mode.

6. A method as in claim 1, wherein the register is an index register.

7. A data processing system, comprising:

an extensible index register, comprising:

a first register portion which is altered by a first index register instruction; and a second register portion which is altered by a second index register instruction, but which is not altered by the first index register instruction;

a first bus, said first bus coupled to said extensible index register;

a second bus, said second bus coupled to said extensible index register; and address generation circuitry, coupled to said extensible index register, a first input of said address generation circuitry coupled to said first bus, an output of said address generation circuitry coupled to said third bus, said address generation circuitry using a combination of said first register portion and said second register portion in order to generate an effective indexed address when the data processing system is performing an indexed addressing operation.

8. A data processing system as in claim 7, wherein said second register portion has a reset value equal to zero.

9. A data processing system as in claim 7, wherein the data processing system is object code compatible with a second data processing system.

10. A data processing system as in claim 9, wherein the first index register instruction uses a first opcode which is identical to a second opcode used by the second data processing system.

11. A data processing system as in claim 10, wherein the second index register instruction uses a third opcode which is tradefined by the second data processing system.

12. A method for providing an extensible register in a first data processing system, the first data processing system being substantially object code compatible with a second data processing system, the method comprising the steps of:

providing an index register having a first register portion and a second register portion, the index register being used during an indexing operation;

receiving a first instruction to alter the index register;

if the first instruction is object code compatible with the second data processing system, updating a first index value stored in the first register portion without altering the second register portion;

if the first instruction is not object code compatible with the second data processing system, updating a second index value stored in both the first and the second register portions;

receiving a second instruction which is object code compatible with the second data processing system; and utilizing both the first and second register portions when executing the second instruction.

13. A method as in claim 12, further comprising the step of:

resetting the second register portion to a zero value when the first data processing system is reset.

14. A method as in claim 12, wherein the second instruction uses an indexed addressing mode.

15. A method as in claim 14, wherein the first register portion is one byte in length and the second register portion is one byte in length.

16. A method as in claim 12, further comprising the step of:

using the first and second register portions to generate an indexed address.

17. A method as in claim 12, further comprising the step of:

using a concatenation of the first and second register portions to perform all instructions which use an indexed addressing mode.

18. A data processing system providing an extensible register, the data processing system comprising:

an information bus;

an execution unit, coupled to said information bus, said execution unit comprising:

an arithmetic logic unit, having a first input, having a second input, and having an output;

a first bus coupled to the first input of said arithmetic logic unit;

a second bus coupled to the second input of said arithmetic logic unit;

a third bus coupled to the output of said arithmetic logic unit;

an index register having a first register portion coupled to at least one of said first and second buses and coupled to said third bus, and having a second register portion coupled to at least one of said first and second buses and coupled to said third bus;

address buffer logic, coupled to said third bus and to said information bus, said address buffer logic supplying a combination of the first register portion and the second register portion to said information bus in order to provide an effective address when the data processing system is performing an indexed addressing operation; and control circuitry, coupled to said execution unit, said control circuitry receiving a first plurality of old instructions which modify said index register by modifying only the first register portion, said control circuitry receiving a second plurality of new instructions which modify said index register by modifying both the first and second register portions, and said control circuitry receiving a third plurality of both old and new instructions which perform the indexed addressing operation.

19. A data processing system as in claim 18, wherein the first plurality of old instructions includes an old increment instruction which increments the first register portion and does not affect the second register portion, and wherein the second plurality of new instructions includes a new add instruction which adds a value to the concatenation of the first register portion and the second register portion.

20. A data processing system as in claim 18, wherein said address buffer logic comprises:
   a first storage buffer coupled to said third bus; and
   a second storage buffer, coupled to said first storage buffer and to said information bus.

21. A method for operating a data processor, the method comprising the steps of:
   providing an arithmetic logic unit;
   providing an index register, the index register having a first register portion and having a second register portion;
   providing at least one bus for coupling the index register to the arithmetic logic unit;
   providing control circuitry for receiving and executing a first indexing instruction, a second indexing instruction, and a third indexing instruction;
   in response to the control circuitry receiving the first indexing instruction, modifying said index register by updating only the first register portion;
   in response to the control circuitry receiving the second indexing instruction, updating said index register by updating both the first and second register portions; and
   in response to the control circuitry receiving the third indexing instruction, combining the first register portion and the second register portion in order to provide an effective address and performing an indexed addressing operation using the effective address;
   wherein in response to receiving the first indexing instruction a first index value is stored in the first register portion and in response to receiving the second indexing instruction a second index value is stored in the first and second register portions; and
   wherein the second index value is greater bit length than the first index value.

22. A method for operating a data processor as in claim 21, wherein all instructions which require the indexed addressing operation use the effective address formed by combining the first and second register portions.

23. A method for operating a data processor as in claim 21, wherein said step of combining the first register portion and the second register portion comprises the step of:
   performing an arithmetic logic unit operation in the arithmetic logic unit.

24. A first data processor, which is object code compatible with a second data processor, the first data processor comprising:
   an index register, comprising:
      a first register portion which is altered by a first instruction; and
      a second register portion which is altered by a second instruction, but which is not altered by the first instruction; and
   address generation circuitry, coupled to said index register, said address generation circuitry using a combination of said first register portion and said second register portion in order to generate an effective address when the first data processor is performing a third instruction which requires an indexed addressing operation,
wherein the first instruction is resident in an opcode map of the first data processor and has a first opcode value, wherein the first instruction is resident in an opcode map of the second data processor and has said first opcode value, wherein the second instruction is resident in the opcode map of the first data processor and has a second opcode value, wherein the second instruction is undefined in the opcode map of the second data processor, wherein the third instruction is resident in the opcode map of the first data processor and has a third opcode value, and wherein the third instruction is resident in the opcode map of the second data processor and has said third opcode value.

25. A first data processor as in claim 24, wherein a combination of said first and second register portions form said index register, wherein said index register stores an index register value, and wherein the index register value is incremented during execution of the second instruction by the first data processor.

26. A first data processor as in claim 25, wherein the second instruction performs a compare operation.

27. A first data processor as in claim 26, wherein the compare operation is a compare and branch if equal operation.

28. A first data processor as in claim 25, wherein the second instruction performs a move operation using an indexed addressing mode.

29. A first data processor as in claim 24, further comprising: a bus, coupled to said index register; and a stack pointer register, coupled to said bus.

30. A first data processor as in claim 29, wherein the second instruction loads the second register portion with a next operand pointed to by said stack pointer register, and wherein the second instruction does not affect the first register portion.

31. A first data processor as in claim 29, wherein the second instruction loads both the first and second register portions of said index register with a stack pointer value stored in said stack pointer register.

32. A first data processor as in claim 24, wherein the second instruction loads both the first and second register portions of said index register with a value determined by the second instruction.

33. A first data processor as in claim 24, wherein a combination of said first and second register portions form said index register, and wherein the second instruction adds a value determined by the second instruction to said index register.

34. A first data processor, which is object code compatible with a second data processor, the first data processor comprising:
   a first bus;
   a second bus;
   a third bus;
   an index register having a first register portion coupled to at least one of said first and second buses, and having a second register portion coupled to at least one of said first and second buses;
   control circuitry which receives a first instruction, a second instruction, and a third instruction, said control circuitry modifying said index register by modifying only the first register portion when the first data processor is executing the first instruction, said control circuitry modifying said index register by modifying both the first and second register portions when the first data processor is executing the second instruction, and said control circuitry performing an indexed addressing operation using an effective address when the first data processor is executing the third instruction using an indexed addressing mode; and address generation circuitry, having an input coupled to at least one of said first and second buses, and having an output coupled to said third bus, said address generation circuitry supplying a combination of the first register portion and the second register portion to said third bus in order to provide the effective address when the first data processor is executing the third instruction using the indexed addressing mode, and wherein the first instruction resides in an opcode map of the first data processor and in an opcode map of the second data processor, wherein the second instruction resides in the opcode map of the first data processor but is undefined in the opcode map of the second data processor, and wherein the third instruction resides in the opcode map of the first data processor.

35. A first data processor as in claim 34, wherein said address generation circuitry comprises an arithmetic logic unit.

36. A first data processor as in claim 34, wherein said control circuitry comprises a decode circuit to decode at least a portion of a first opcode of the first instruction, to decode at least a portion of a second opcode of the second instruction, and to decode at least a portion of a third opcode of the third instruction.

37. A first data processor as in claim 34, wherein all instructions that use the indexed addressing mode and that reside in both the opcode maps of the first and second data processors use the combination of the first register portion and the second register portion to provide the effective address for the indexed addressing mode.

38. A first data processor as in claim 34, wherein the second register portion is rest to a zero value when the first data processor is reset.

39. A first data processor as in claim 34, wherein the first register portion is eight bits in length and the second register portion is eight bits in length.

* * * * *

UNITED STATES PATENT AND TRADEMARK OFFICE
CERTIFICATE OF CORRECTION

PATENT NO: 5,680,632

DATED: October 21, 1997

INVENTORS: Charles F. Studor; James S. Divine; Michael L. Catherwood

It is certified that error appears in the above-identified patent and that said Letters Patent is hereby corrected as shown below:

Column 15, line 63, change "tradefined" to --undefined--

Column 20, line 17, change "rest" to --reset--

Signed and Sealed this

Seventh Day of April, 1998

*Attest:*

BRUCE LEHMAN

*Attesting Officer*     *Commissioner of Patents and Trademarks*